United States Patent [19]

Ayata et al.

[11] Patent Number: 4,866,532
[45] Date of Patent: Sep. 12, 1989

[54] PRINTING APPARATUS FOR SYSTEM

[75] Inventors: Naoki Ayata, Machida; Seiji Saito, Yokosuka; Hidetoshi Suzuki; Kunitaka Ozawa, both of Tokyo; Noboru Koumura, Narashino, all of Japan

[73] Assignee: Canon Kabushiki Kaisha, Tokyo, Japan

[21] Appl. No.: 131,411

[22] Filed: Dec. 10, 1987

Related U.S. Application Data

[60] Division of Ser. No. 930,046, Nov. 12, 1986, Pat. No. 4,718,040, which is a continuation of Ser. No. 671,025, Nov. 14, 1984, abandoned, which is a continuation of Ser. No. 618,460, Jun. 8, 1984, abandoned, which is a continuation of Ser. No. 370,463, Apr. 21, 1982, abandoned.

[30] Foreign Application Priority Data

| Apr. 27, 1981 | [JP] | Japan | 56-62543 |
| Apr. 27, 1981 | [JP] | Japan | 56-62544 |
| Jul. 16, 1981 | [JP] | Japan | 56-109951 |
| Jul. 16, 1981 | [JP] | Japan | 56-109952 |

[51] Int. Cl.$^4$ ............................................. H04M 1/40
[52] U.S. Cl. ................................ 358/443; 358/296
[58] Field of Search .............. 358/256, 280, 293, 294, 358/296; 346/44

[56] References Cited

U.S. PATENT DOCUMENTS

| 3,723,645 | 3/1973 | Takami et al. | 178/6.6 A |
| 4,214,276 | 7/1980 | Pugsley et al. | 358/256 |
| 4,231,069 | 10/1980 | Wellendorf et al. | 358/256 |
| 4,467,348 | 8/1984 | Fujii et al. | 358/280 |
| 4,527,885 | 7/1984 | Ayata et al. | 358/280 |
| 4,562,485 | 12/1985 | Maeshima | 358/280 |
| 4,563,706 | 1/1986 | Nagashima | 358/280 |
| 4,622,594 | 11/1986 | Homjo et al. | 358/280 |

FOREIGN PATENT DOCUMENTS

| 2309634 | 9/1974 | Fed. Rep. of Germany . |
| 2933422 | 2/1980 | Fed. Rep. of Germany . |
| 3030099 | 2/1981 | Fed. Rep. of Germany . |

Primary Examiner—Edward L. Coles, Sr.
Attorney, Agent, or Firm—Fitzpatrick, Cella, Harper & Scinto

[57] ABSTRACT

A printing apparatus or system has CCDs for reading out image data from an original or originals, a memory for storing the image data, a plurality of recording sections with recording heads, a control for controlling the overall circuitry and mechanical parts. A desired number of copies in black or in color can be produced within a short period of time in accordance with the size of the original image and/or color. A red image which does not require high resolution as much as a black image is automatically reproduced with lower resolution while maintaining high resolution at black portion of the same image. A plurality of recording sections may be equally used for printing only a small number of copies.

28 Claims, 15 Drawing Sheets

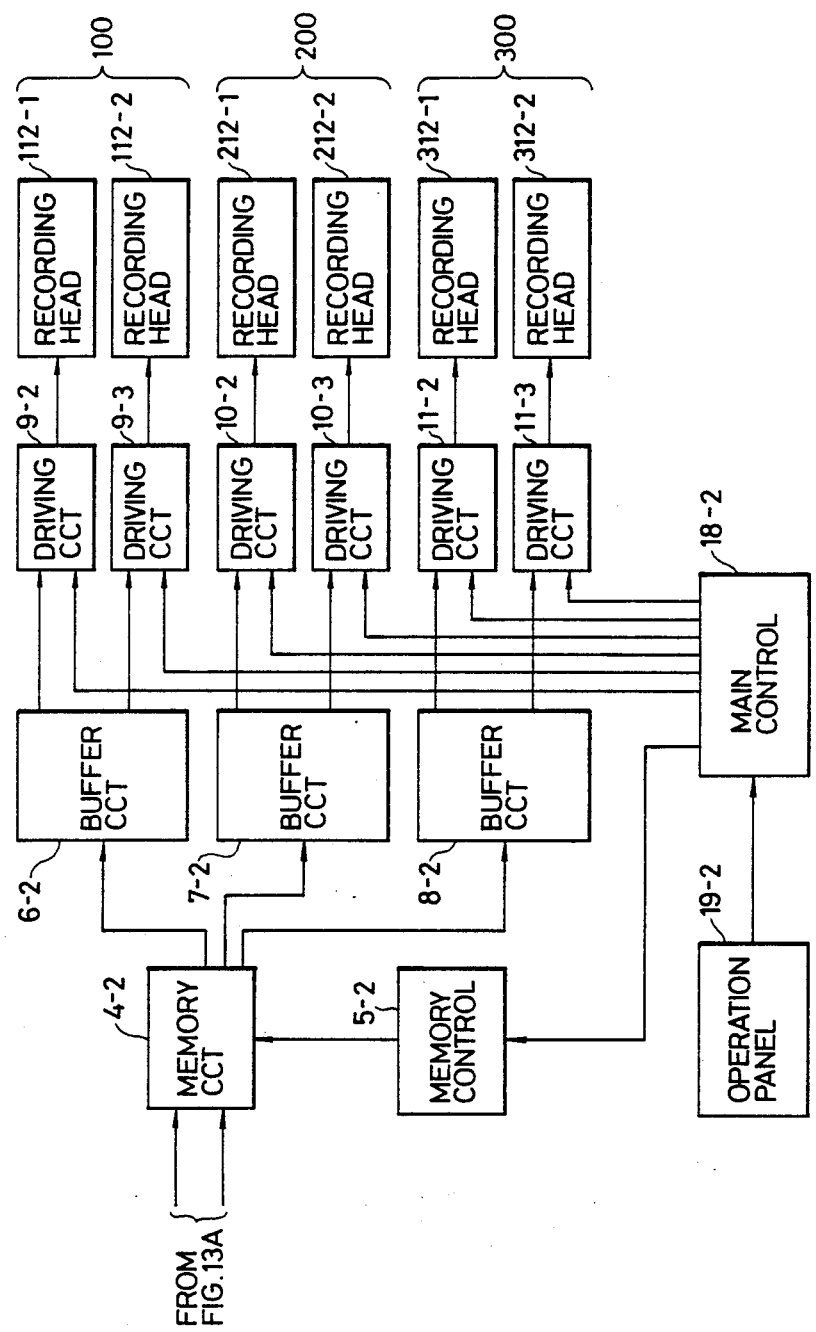

PRINTING APPARATUS FOR SYSTEM

This is a division of application Ser. No. 930,046, filed Nov. 12, 1986, now U.S. Pat. No. 4,718,040 which is a continuation of Ser. No. 671,025, filed Nov. 14, 1984, now abandoned, which is a continuation of Ser. No. 618,460, filed June 8, 1984, now abandoned, which is a continuation of Ser. No. 370,463, filed Apr. 21, 1982, now abandoned.

BACKGROUND OF THE INVENTION

1. Field of the Invention

The present invention relates to a printing apparatus or system for forming an image on a recording medium.

2. Description of the Prior Art

Various types of recording apparatuses are known including copying machines utilizing electrophotography or inkjet recording apparatuses. However, in order to reproduce the image of the same original or same source on a plurality of recording paper sheets (especially in different modes), the same recording procedure must be performed a corresponding number of times. This means that reproduction of hard copies of a desired number requires time which is the product of the time required for a single recording operation and the desired number of hard copies.

With a conventional recording apparatus, in order to produce a plurality of copies from a plurality of originals or from a plurality of pieces of data, the recording operation must be performed a plurality of times for each original. Therefore, an external sorter is required to sort the recording paper sheets with images formed thereon according to the proper order.

When the printing apparatus has a plurality of recording sections or recording heads, the frequency that the individual recording sections or heads are used may differ from one another, resulting in fatigue at a predetermined recording section. Clogging of ink is caused at recording sections which are used less frequently.

The conventional printing apparatus has one output section for the copy. Therefore, if the printed paper sheet is left unremoved, this results in inconvenience of another operator.

If recording in black is performed at 16 dot/mm density in the fine mode with a printing apparatus for printing black and polychromatic images, the recording in other colors than black is performed in the fine mode as well. However, the use of colors other than black such as red is limited; for example, red is used mainly for underlying or marking portions of black originals. Therefore, a high resolution is not so much required for recording in other colors than black. For this reason, recording in colors other than black at a density same as that for recording in black results in high manufacturing cost of the overall apparatus and is very uneconomical.

SUMMARY OF THE INVENTION

It is an object of the present invention to provide a printing apparatus or system which solves the problems of the prior art printing apparatuses.

It is another object of the present invention to provide a printing apparatus or system which is capable of shortening the time for printing a plurality of copies.

It is still another object of the present invention to provide an improvement in a printing apparatus or system having an electronic sorter function.

It is still another object of the present invention to provide a printing apparatus which is capable of outputting an image stored in a memory through a predetermined output section.

It is still another object of the present invention to provide a copying machine which is capable of printing out the image within a short period of time from the readout operation of the original and which is capable of storing the readout data in the memory.

It is still another object of the present invention to provide a printing apparatus which is capable of printing in accordance with the kind of image data stored in the memory.

It is still another object of the present invention to provide a printing apparatus which is capable of changing the image (resolution) quality mode according to the recording color.

It is still another object of the present invention to provide an improvement in a printing apparatus or system which is capable of printing on recording media of different sizes.

It is still another object of the present invention to provide an improvement in a printing apparatus or system which is capable of printing an image on a recording medium with a multihead.

It is still another object of the present invention to provide an improvement in a printing apparatus or system which is capable of printing by inkjet operations.

It is still another object of the present invention to provide an improvement in a copying machine or system which reads image data on an original, converts the readout data into electric signals, and prints an image on the basis of the electric signals.

The above and the other objects and features of the present invention will become apparent from the following description of the invention when taken in conjunction with the accompanying drawings.

DETAILED DESCRIPTION OF THE PREFERRED EMBODIMENTS

Figure 1:
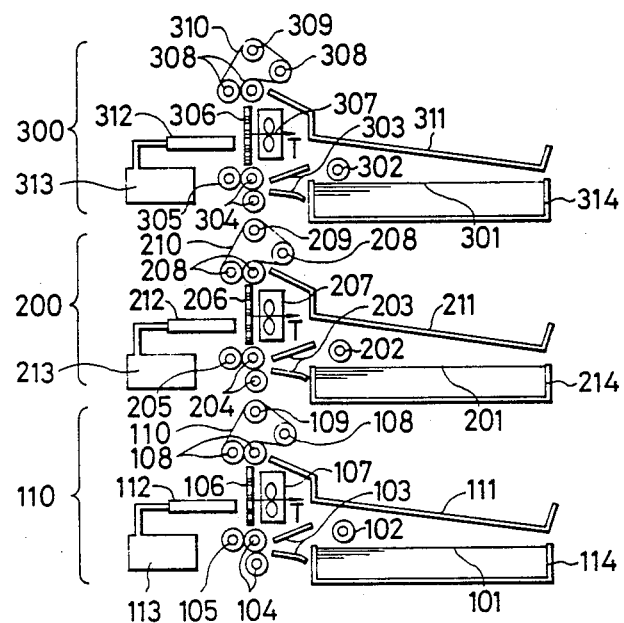
FIG. 1 is a schematic view showing a printing apparatus or system according to an embodiment of the present invention.
Figure 2:
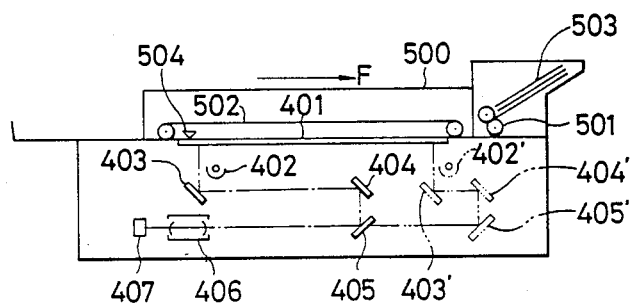
FIG. 2 is a schematic view showing an example of a readout device for the apparatus shown in FIG. 1.

The preferred embodiments of the present invention will now be described with reference to the accompanying drawings. FIG. 1 shows the first embodiment of the present invention, which has a first recording section 100, a second recording section 200, and a third recording section 300. The first through third recording sections 100, 200 and 300 have recording heads which are, in the case of this embodiment, inkjet heads 112, 212 and 312. Each inkjet head is of a full-line type wherein a plurality of recording elements (ink nozzles or orifices) are linearly aligned in the direction normal to the plane of the drawing. These inkjet heads 112, 212 and 312 are driven by electric signals from a data source shown in FIGS. 2 and 3 for recording. These recording sections 100, 200 and 300 and the readout device of FIG. 2 are vertically aligned in three steps by supports (not shown). However, these recording sections may be incorporated in the form of units and may be separately arranged. The respective recording sections only differ from one another in the arrangement for control and are the same in the other mechanisms.

Recording paper sheets 101, 201, and 301 are held in recording paper sheet cassettes 115, 215 and 315. The printing apparatus of this embodiment further has pickup rollers 102, 202, 302; guide plates 103, 203 and 303; register roller 104, 204 and 304; first feed rollers 105; 205 and 305; platens 106, 206 and 306 with small holes; suction fans 107, 207 and 307; second feed rollers 108, 208 and 308; suspension rollers 109, 209 and 309; convey belts 110, 210 and 310; exhaust trays 111, 211 and 311; recording heads or inkjet heads 112, 212 and 312; and ink tanks 113, 213 and 313.

The mode of operation of the printing apparatus of the configuration as described above will be described. Since the recording sections 100, 200 and 300 all operate in the same manner, a description will only be made on the first recording section 100.

The recording paper sheet 101 stored in the cassette 115 is fed to the register roller 104 held in the stationary status along the guide plate 103 upon the rotation of the pickup roller 102 to form a loop. With the rotation of the register roller 104, the recording paper sheet 101 is clamped between the register roller 104 and the first feed rollers 105 to be fed toward the inkjet head 112. The fan 107 and the platen 106 with small holes oppose the inkjet head 112. Air is blown by the fan 107 in the direction indicated by arrow T in the figure. The recording paper sheet 101 past the first feed rollers 105 is transferred onto the platen 106 toward the second feed rollers 108 while it is drawn by the fan 107.

The inkjet head 112 is a full-line type inkjet head wherein a plurality of recording elements are vertically arranged in the direction normal to the plane of drawing. The inkjet head 112 is driven by a driving circuit in accordance with the electric signals from a data source (not shown). When the leading end of the recording paper sheet reaches the second feed roller 108 after recording, the recording paper sheet is exhausted to the exhaust tray 111 by the second feed roller 108 and the convey belt 110.

FIG. 2 is a schematic sectional view of an original readout device at an input section of the printing apparatus shown in FIG. 1, which has an original glass table 401, a rod-shaped light source such as a halogen lamp or a fluorescent lamp, a first mirror 403, a second mirror 404, a third mirror 405, a lens 406, and a one-dimensional solid state image pickup element 407 such as a CCD. An original handler 500 automatically feeds an original 503 onto the original glass table 401. After scanning operation, the original handler 500 automatically exhausts the original and feeds the next original. The original handler 500 is free to open or close with respect to the original glass table 401.

The mode of operation of the original readout device will be described. The original placed on the original glass table 401 is illuminated by light emitted by the rod-shaped light source 402. The image of the original is formed on the CCD 407 by the lens 406 through the first mirror 403, the second mirror 404 and the third mirror 405 for scanning (subscanning) the original. The direction of main scanning of the CCD 407 is normal to the plane of the drawing. The rod-shaped light source 402 and the first mirror 403 are formed integrally with each other by a support (not shown) and are moved in the direction indicated by arrow F on guide rails (not shown) to scan (subscan) the image of the original. The second mirror 404 and the third mirror 405 are integrally supported by a support (not shown) and are moved on guide rails (not shown) in the same direction at a speed ½ the speed of the first mirror 403. The rod-shaped light source 402, the first mirror 403, the second mirror 404, and the third mirror 405 are moved to the positions 402', 403', 404' and 405' indicated by dotted lines. The length of the optical path from the original glass table 401 through the mirrors 403, 404 and 405 to the lens 406 is kept constant. Therefore, if the signals from the light-receiving elements of the CCD 407 are sequentially read out, raster scanning signals of the original are sequentially obtained. The original handler 500 has a roller for picking up an original and feeding it on the original glass table, and a belt for setting the original or the original glass table and exhausting the original from the original glass table. When a sensor 504 senses the original set on the original glass table, the original is scanned.

Figure 3:
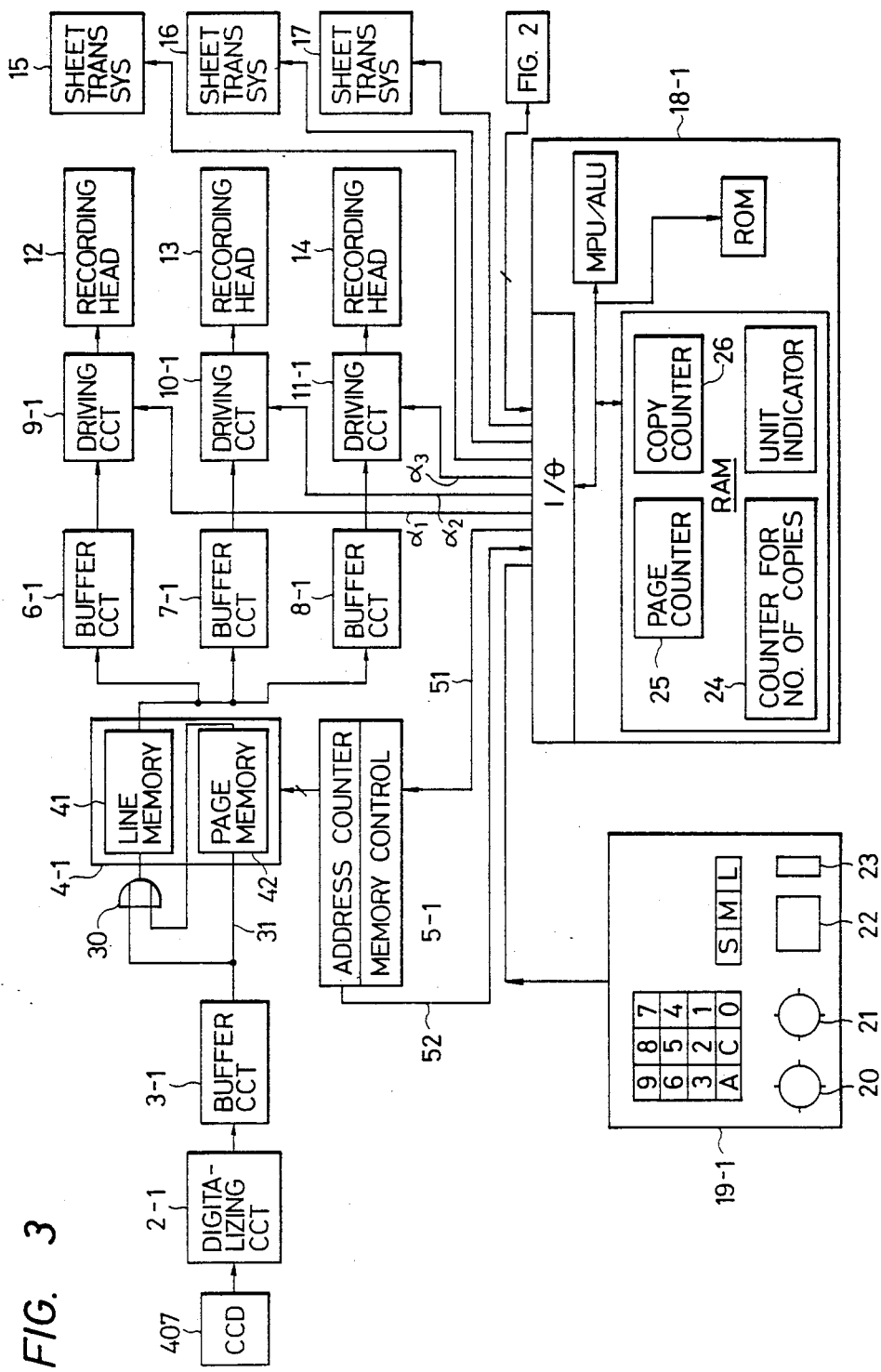
FIG. 3 is a block diagram of a control for the apparatus shown in FIG. 1.

FIG. 3 shows an example of a control circuitry for the apparatus shown in FIGS. 1 and 2.

A CCD 1 corresponds to the CCD 407 shown in FIG. 2. A digitizer 2-1 of known configuration is connected to the output end of the CCD 1. A memory 4-1 is a memory capable of writing and reading out data such as a RAM (random-access memory). The memory 4-1 has a line memory 41 having a capacity corresponding to one line of the CCD 1 and a page memory 42 having a capacity corresponding to several pages of the original. A memory control 5-1 includes a counter for specifying the memory address. First, second and third buffer circuits 6-1, 7-1 and 8-1 are connected to the output end of the memory 4-1. First, second, and third driving circuits 9-1, 10-1 and 11-1 are connected to the output ends of the buffer circuits 6-1, 7-1 and 8-1, respectively. First, second, third inkjet heads 12, 13 and 14 correspond to the first, second and third inkjet heads 112, 212 and 312, respectively. Sheet transfer systems 15, 16 and 17 are for first, second and third recording sections (corresponding to 100, 200 and 300 shown in FIG. 1). A control 18-1 controls the overall circuitry and mechanical parts and comprises a microcomputer. This microcomputer has a program memory ROM, a processor MPU/ALU, and I/O ports. An operation panel 19-1 has a dial 20 for setting the number of copies to be produced, a dial 21 for setting the number of pages of the original, a start button 22 for instructing the start of the recording operation, a power source switch 23, and so on. The control 18-1 has a counter 24 for setting the number of copies to be produced, a page counter 25 for counting the number of pages of the original, and a copy counter 26 for displaying the number of copies of the same page of the original. These counters correspond to the memory areas of the RAM (memory 4-1). An OR gate 30 is for inputting the image signal from the page memory 42 or the image signal from the CCD 1 to the line memory 41. The image signal from the CCD 1 is input to the page memory 42 through a line 31. A memory control line 51 is for inputting data specifying the memory address, for example, to the address counter. A line 52 is for inputting the count data of the address counter to the control or microcomputer 18-1 and serves to discriminate the size of the image of the data stored in the memory. The ROM described above stores a control program of the flowchart to be described below. The MPU performs the control operations to be described below by accessing the ROM, the RAM and the I/O ports.

The mode of operation of the circuitry shown in FIG. 3 will now be described. The image data read out by the CCD 1 is binary-encoded or digitized by the digitizer 2-1. For the sake of simplicity, the following description will be made assuming that the digitizer 2-1 performs binary encoding.

The binary coded signal from the digitizer 2-1 is stored in the memory 4-1 through the buffer circuit 3-1. As has been described above, the memory 4-1 has the line memory 41 having a capacity corresponding to one line and the page memory 42 having a capacity corresponding to several pages. The image data corresponding to one line is read out and stored in the line memory 41 for sequential recording in units of lines. Alternatively, the image data corresponding to several pages may be stored in the page memory 42 and may then be read out for sequential recording in units of pages.

The memory control 5-1 is controlled by the control 18-1 and generates an address signal, a timing signal, a read/write signal and so on for writing and reading data in and out of the memory 4-1. The image data stored in the memory 4-1 is output to the buffer circuits 6-1, 7-1 and 8-1 under the control of the memory control 5-1. The outputs from the buffer circuits drive the inkjet heads 12, 13 and 14 through the driving circuits 9-1, 10-1 and 11-1, respectively, for recording. Since the operation of the driving circuits 9-1, 10-1 and 11-1 is controlled by the control 18-1, the inkjet heads 12, 13 and 14 are selected as needed.

The control 18-1 also controls the sheet transfer systems 15, 16 and 17 comprising the pickup rollers 102, 202 and 302; the register rollers 104, 204 and 304; the feed rollers 105, 205, 305, 108, 208 and 308; and so on. These rollers are driven by a single drive source (not shown) through a belt or the like and clutches (not shown). Alternatively, drive sources such as stepping motors may be directly coupled to the individual rollers.

The control 18-1 systematically controls the on/off operation of these clutches to transfer the recording paper sheet as has been described with reference to FIG. 1. As in the case of the inkjet heads, the sheet transfer systems 15 (for the recording section 100), 16 (for the recording section 200), and 17 (for the recording section 300) may be selected as needed.

Figure 4A:
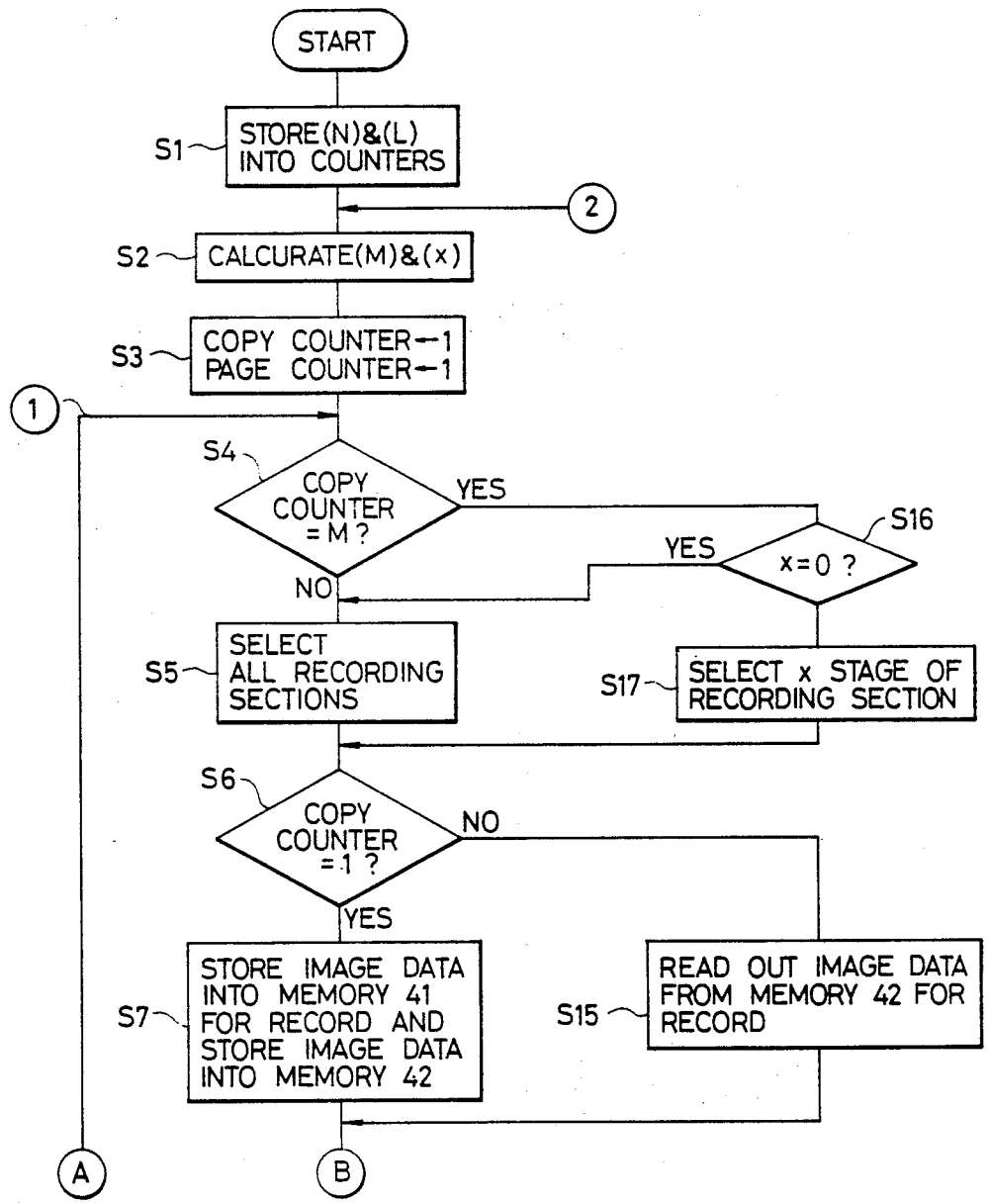
FIG. 4 composed of FIG. 4A
FIG. 4B is a flowchart showing an example of a control sequence for the apparatus shown in FIG. 1.
Figure 4B:
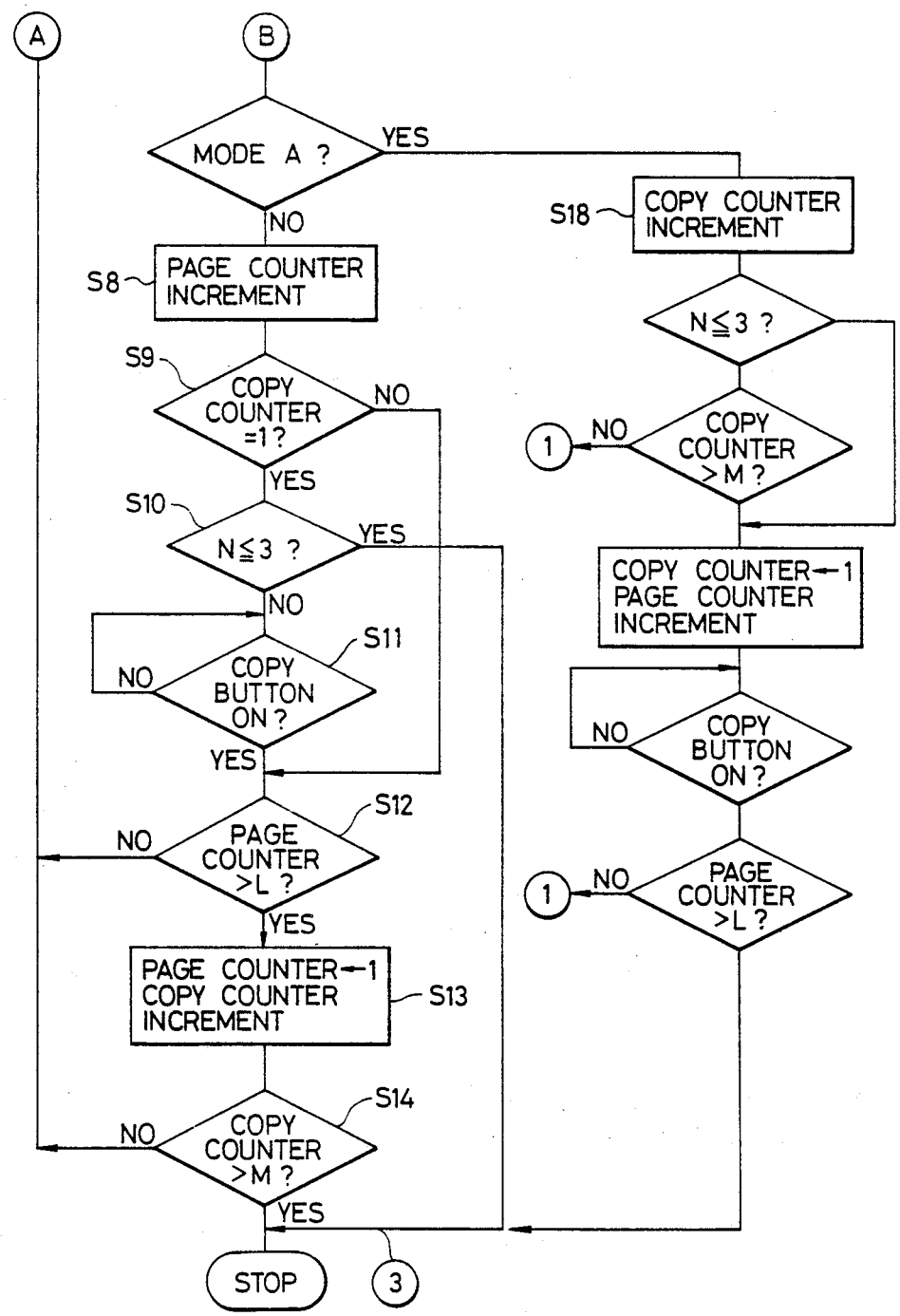

FIG. 4 is a flowchart showing the control flow according to the present invention. A description will be made for a case for copying eleven copies of an original of four pages. The page dial 21 on the operation panel 19-1 is set to "4", the dial 20 is set to "11", and the copy button 22 is depressed. In step S1, the control 18-1 reads the number of pages L of the original and the number of copies N to be produced, and store them in the page counter 25 and the counter 24, respectively. In step S2, the number of copying operations M and the number of stages X of the recording section for the final recording operation are calculated. Since there are three stages in this embodiment, three stages are used for the final recording operation if the number of copies to be produced is a multiple of 3. If not, one or two stages are used for the final copying operation. According to the embodiment, the number of copying operations M and the number of stages X are determined by the following relation:

$$N = 3 \times (M-1) + M \tag{1}$$

The actual number of copies to be produced is substituted in N, the actual number of copying operations is substituted in M, and "0", "1" and "2" are substituted in X. The values of M and X which satisfy relation (1) are determined.

According to this embodiment, N=11 is substituted in relation (1) above. Then, M is determined to be 4 and X is determined to be 2. These values of M and X are stored in the corresponding memory areas of the RAM.

In step S3, "1" is stored in both a copy counter 26 and the page counter 25. In step S4, it is discriminated if the count of the copy counter 26 is M or 4. In this case, the count of the copy counter 26 is "1". Therefore, the flow branches to NO to advance to step S5. An enable signal is supplied to the driving circuits 9-1 to 11-1 to select all the recording sections. In step S6, it is discriminated if the count of the copy counter 26 is "1". In this case, the count is "1". Therefore, the flow branches to YES to advance to step S7. In step S7, the scanning operation described with reference to FIG. 2 is performed. The image data sequentially supplied from the buffer circuit 3-1 is temporarily stored in the line memory 41 in units of lines. The image data stored in the line memory 41 is supplied in units of lines to the inkjet heads 12 to 14 through the buffer circuits 6-1 to 8-1 and the driving circuits 9-1 to 11-1. Each recording section records the image of one line. The image data of one line is also stored in the page memory 42. When the original is scanned in units of lines and recording for one page is completed, the image data corresponding to one page is thus stored in the page memory 42. In step S7, the original of one page is recorded on three recording paper sheets to produce three copies.

In step S8, the count of the page counter 25 is incremented by one to "1". In step S9, it is discriminated if the count of the page counter 26 is "1". In this case, the count of the counter 26 is "1". Therefore, it is discriminated in step S10 if $N \leq 3$. The flow advances to step S11 wherein it is discriminated if the copy button 22 is turned on. When the operator places the second page of the original on the original glass table 401 (FIG. 2) and depresses the copy button 22, the flow advances to step S12 wherein it is discriminated if the count of the page counter 25 is larger than L or "4". If it is discriminated in step S11 that the image data has been completely stored in the memory 4-1 by the microcomputer or control 18-1, the original handler may be operated to exhaust the first page of the original. The automatic setting of the second page of the original on the original glass table and completion of this setting operation are discriminated to advance to step S12, in this case. In the case of the example being described, the count of the page counter 25 is "2". Therefore, the flow branches to NO to advance to step S4. The sequence continues through steps S5, S6, S7, S8, S9 and S10 to perform the first recording operation of the second page of the original. Thus, the image data of the second page of the original is all stored in the page memory 42. The count of the copy counter 26 is "1", and the count of the page counter 25 is "3", at this time. When the third page of the original is placed on the original glass table 401 subsequentially, steps are performed in the order of steps S12, S4, S5, S6, S7, S8, S9 and S10. The third page of the original is similarly recorded and the image data therefore is stored. Recording and storing of the image data for the fourth page of the original are similarly performed. In step S9, wherein the recording of the fourth page is completed, the count of the page counter 25 is "5" while that of the copy counter 26 is "1".

Assume that the operator depresses the copy button 22 for recording fourth copy and thereafter of each page of the original. Then, since the count of the page counter 25 is "5" in step S12, the flow branches to YES to advance to step S13. In step S13, the count of the page counter 25 is incremented by one to "2". The flow then advances to step S14 wherein it is discriminated if the count of the counter 26 is larger than M or "4". Since the count of the copy counter 26 is "2" in this case, the flow advances to steps S4, S5 and S6. Since the count of the copy counter 26 is "2" in step S6, the flow branches to NO to advance to step S15. In step S15, the image data for the first page of the original is read out from the page memory 42. Steps S8, S9, S12, S4, S5, S6 and S15 are repeated three times to record the forth to sixth copies of the second to fourth pages of the original.

In step S8, the count of the page counter 25 is incremented by one to "5". The flow advances to step S13 through steps S9 and S12 to make the count of the page counter 25 to "1" and to increment the count of the copy counter 26 by one to "3". The flow advances from step S14 to step S15 through steps S4, S5 and S6. The same sequence as described above is repeated to record the seventh to ninth copies of the first to fourth pages of the original. When the recording operation of the fourth page is completed in step S15 and the flow advances through steps S8, S9, S12 and S13, the count of the copy counter 26 is "4". When the flow advances to step S4 through step S14, it branches to YES to advance to S16.

In this case, X is "2". Therefore, the flow advances to step S17 to select the two stages of the recording sections 100 and 200, for example. Thereafter, the recording section 300 does not perform recording. Then, the flow advances from step S6 to step S15 to record the tenth and eleventh copies of the first page of the original. When steps S8, S9, S12, S4, S16, S17, S6 and S15 are repeated three times as described above, the tenth and eleventh copies of the second to fourth pages of the original are produced. When the flow advances through steps S8, S9, S12 and S13, the count of the copy counter 26 becomes "5". Therefore, the flow branches to YES from step S14 and the sequence is completed.

When eleven copies of four pages each of the original are produced in this manner, four copies of the first to fourth pages are exhausted to the exhaust trays 114 and 214 of the recording sections 100 and 200 in the sequential order. Meanwhile, three copies of the first to third pages are exhausted to the exhaust tray 314 of the recording section 300 in sequential order.

According to this embodiment, a plurality of copies may be produced upon a single scanning operation of the original even if the number of copies exceeds the number of recording sections or recording heads. Thus, the recording time may be reduced to the minimum.

According to this embodiment, the recording section also serves as a sorter when more than two copies of the same original are produced. Therefore, the manual or mechanical sorting operation after copying operation need not be performed, improving the copying efficiency.

The flow after step S18 corresponds to a case wherein a mode key A is depressed or sorter function is released. In other words, N is reset after recording every page of the original. In this case, the capacity of the page memory 42 may be made small to correspond to one page.

A case will now be described for producing a desired number of copies at a selected recording section or units.

Figure 5:
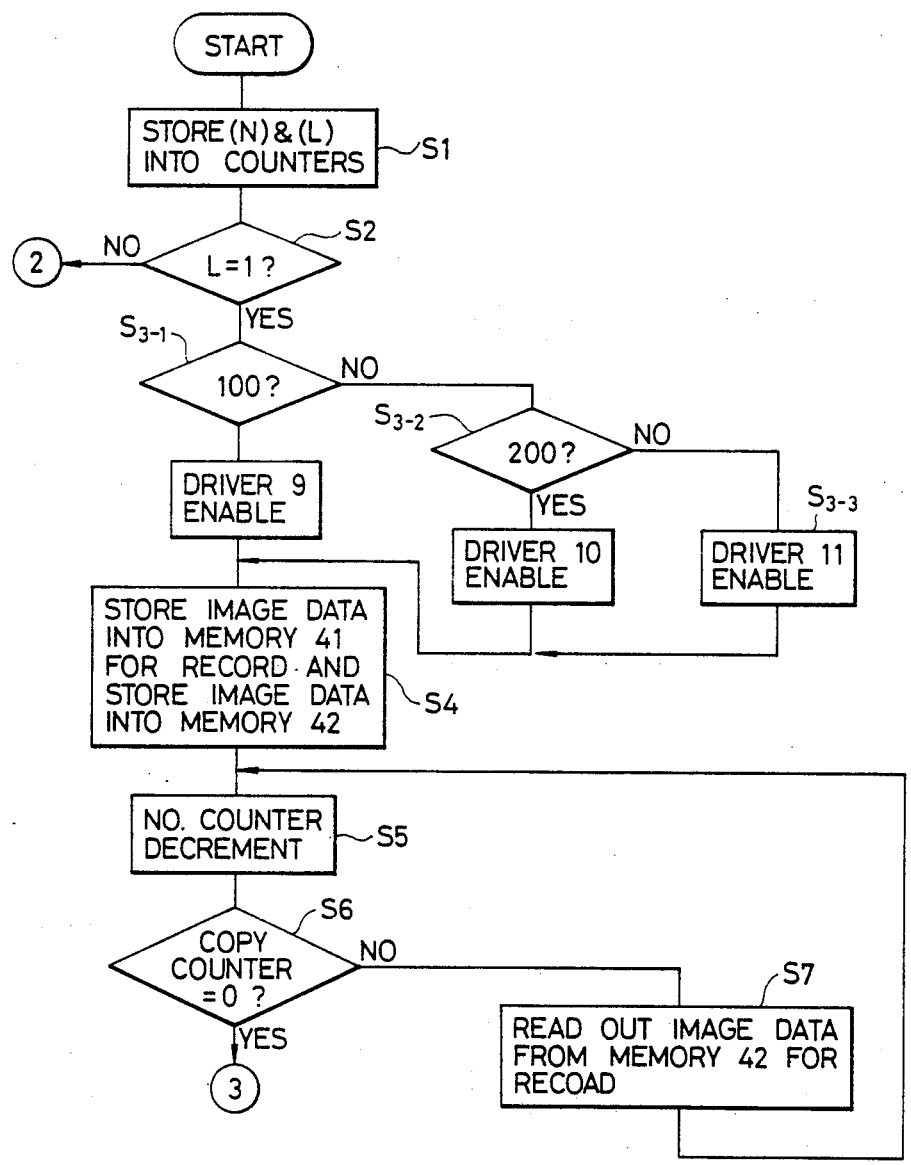
FIGS. 5 to 7, 9 composed of FIG. 9A and FIG. 9B and 10 are flowcharts of other examples of the control sequence for the apparatus shown in FIG. 1.

FIG. 5 is a flowchart of the sequence in this case. A description will be made on a case of producing five copies of an original of one page. The page dial 21 on the operation panel 19 is set to "1", the dial 20 is set to "5", and the copy button 22 is depressed. In step S1, the control 18-1 reads out L and M and store them in the page counter 25 and the copy counter 26, respectively. In step S2, it is discriminated if the number of pages is "1". Since the number of pages is "1" in this case, the flow advances to step S3-1 wherein one recording section, for example, the recording section 100 is selected by depression of ten keys on the operation panel 19. This may be performed by inputting a number "100" to output an enable signal $\alpha1$ to enable the driving circuit 9-1. The selection of the recording section 200 or 300 is similarly performed. If no data is input, the recording section 300 is selected. The enable signals $\alpha1$ and $\alpha2$ go to low level after a predetermined time from the completion of copying a desired number of copies.

The recording section is selected so that the recorded paper sheet may be easily exhausted or seen. Therefore, the flow advances to step S4.

In step S4, the image data sequentially supplied from the buffer circuit 3-1 is temporarily stored in the line memory 41 in units of lines. The image data is then read out and supplied in units of lines to the inkjet head 112 through the buffer circuit 6-1 and the driving circuit 9-1 for recording one line. The image data of one line is also stored in the page memory 42. When the image data is read out and recorded in units of lines to complete recording one page, the image data of one page is stored in the page memory 42. In step S4, one copy of the original of one page is produced.

In step S5, the count of the counter 24 is decremented to "4". The flow then advances to step S6 wherein it is discriminated if the count or the counter 24 is "0". Since it is "4" in this case, the flow advances to step S7. In step S7, the image data of one page stored in the page memory 42 is sequentially read out to record in units of lines at the recording section 100. Steps S5, S6 and S7 are repeated a predetermined number of times until the count of the counter 24 reaches "0". Then, the flow branches to YES from step S6. The flow ends and five copies of the original of one page are produced.

If the number of pages of the original is more than 1, the flow shown in FIG. 4 is executed. In steps S3-1 to S3-3, one of the sheet transfer systems 15 to 17 is selected to feed the recording paper sheets at predetermined timings.

If it is desired to shorten the recording time for recording a plurality of copies of an original of one page, all the recording sections may be used for recording instead of using one recording section.

A plurality of copies of an original of a plurality of pages may be produced at selected recording sections in such a manner that the copies may be exhausted in sequential order.

The size of the printed copy will now be described.

Figure 6:
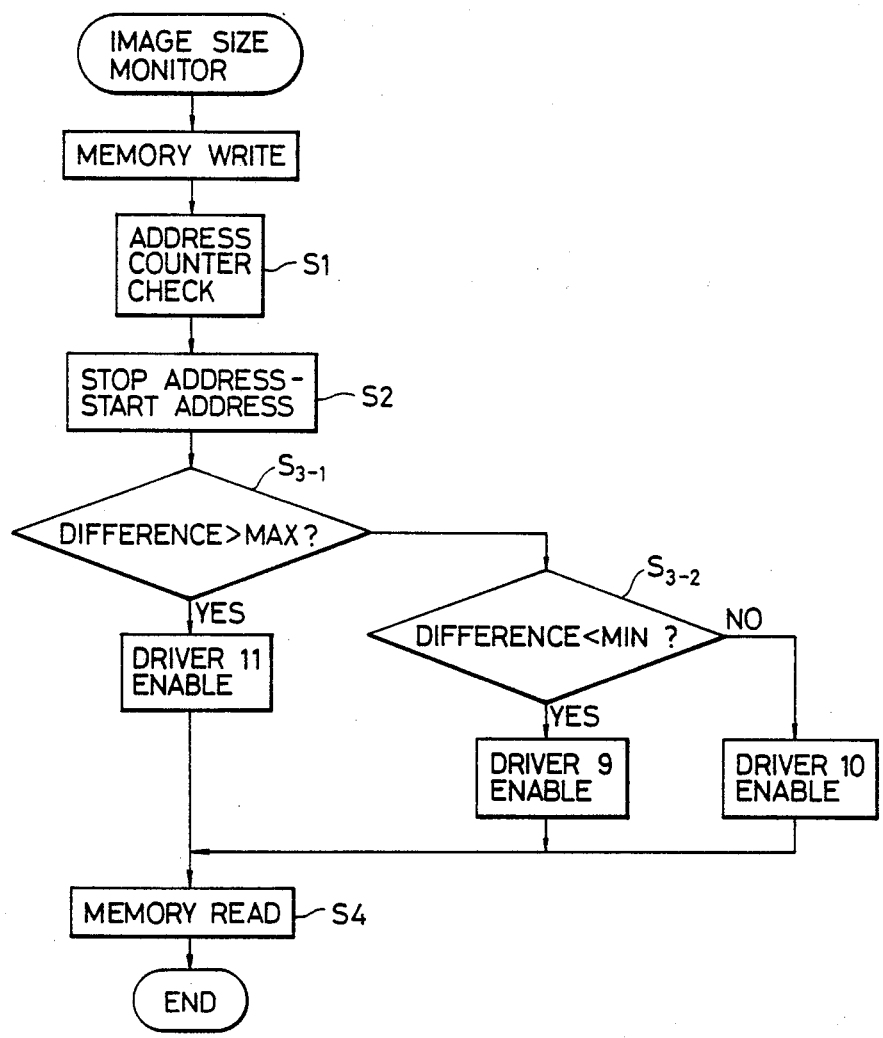

FIG. 6 is a control flowchart for monitoring the size of the image of data stored in the memory so as to select a suitable recording section. In step S1, the incremented count of the address counter after storage of the image data of one image in the page memory 42 is input to the microcomputer or control 18-1 for checking. In step S2, the stop address of the address counter at the time of completion of storage of the data is subtracted from the start address at the time of start of storage. If the difference obtained is large in step S3-1, the image size is discriminated to be large. Then, an enable signal α3 is output to drive the driving circuit 11-1 for driving the recording section 300. If the difference is small, the recording section 100 is selected. If the difference is intermediate, the recording section 200 is selected. The image data is then read out from the memory 42 for printing at the selected recording section (step S4). A cassette holding sheets of large size is mounted on the recording section 300, a cassette holding sheets of intermediate size is mounted on the recording section 200, and a cassette holding sheets of small size is mounted on the recording section 100. The copy may be printed in accordance with the image size in case a plurality of images is stored in the page memory 42.

Figure 7:
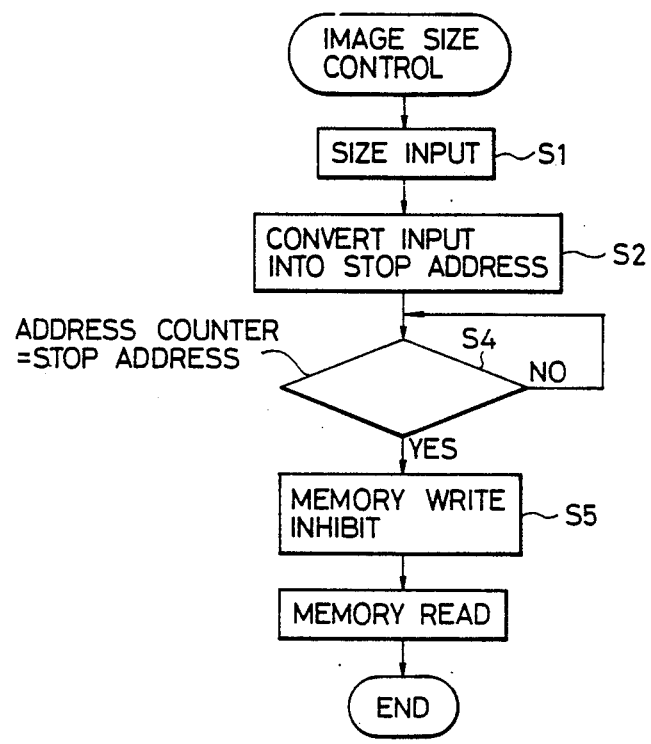

FIG. 7 is a control flowchart for printing in accordance with the size input from the operation panel 19-1. In step S1, a size key L, M or S is operated. According to the size key L, M or S operated, the driving circuit 9-1, 10-1 or 11-1 is enabled to select one of the sheet transfer systems 15 to 17. In step S2, the key data is converted into stop address data for the address counter. In step S3, the address counter is monitored after depression of the copy button. When the monitored address reaches the stop address (step S4), the writing operation of data into the memory 42 is stopped (step S5). Thus, the image data corresponding to the input size is stored in the memory 42 and printing of the data may be performed. This may alternatively be performed by monitoring the line memory or monitoring the address from which the data is read out. The size data need not input by the size key L, M or S but may be input through cassette size sensors or sheet size sensors at the recording sections 100 to 300. Therefore, copies may be produced in accordance with the sheet size. This example (especially those shown in FIGS. 5 to 8) may be applied when one recording section is used and a plurality of inkjet heads of different line widths may be selected, when one recording section is used and a plurality of sheet transfer systems may be selected, or when one recording section is used and a plurality of exhaust trays may be selected.

Figure 8:
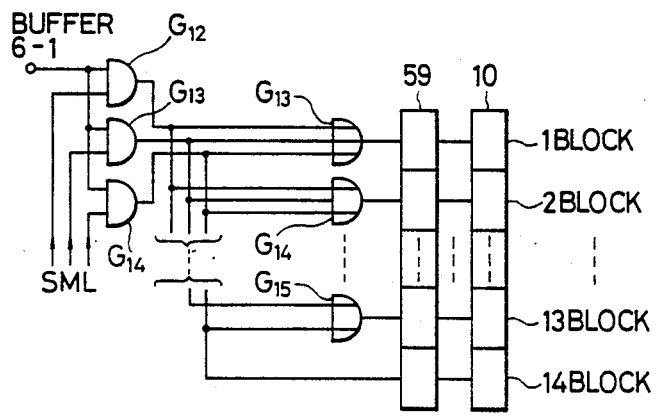
FIG. 8 is a block diagram of another example of a control.

It is also possible to select one inkjet head according to the size discrimination of L, M or S. FIG. 8 shows a circuit diagram of an example of the circuitry for achieving this. In this example, an inkjet head 10 consists of 14 blocks each having 128 nozzles. These nozzles are for printing dots. When the image size is large, all the 14 blocks of the head are enabled. When the size is intermediate, the fourteenth block is disabled. When the size is small, the thirteenth and fourteenth blocks are disabled. Therefore, the sheet transfer belt may not be contaminated even if the size of the image data output is larger than the sheet size.

According to the example of FIGS. 6 to 8, a desired number of copies can be produced for each page of the original in sequential order. This may be seen by modifying the flow shown in FIG. 4, using one recording section.

Since a plurality of copies is recorded by a single recording section or head, handling of the recording paper sheet is easy.

It is also possible to display the image size utilizing a size signal.

An embodiment will now be described wherein a plurality of recording sections or heads are substantially equally used.

Figure 9A:
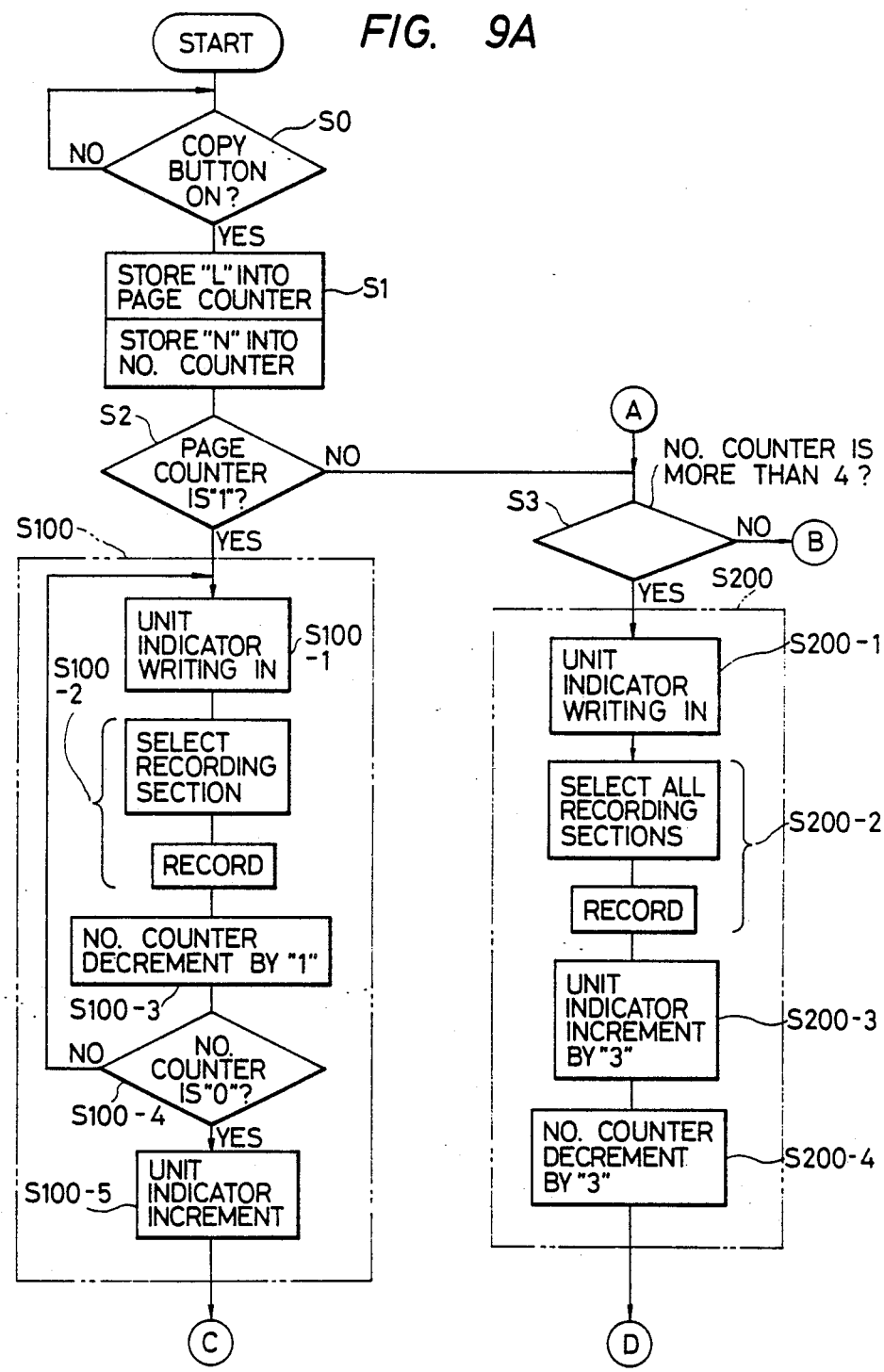
Figure 9B:
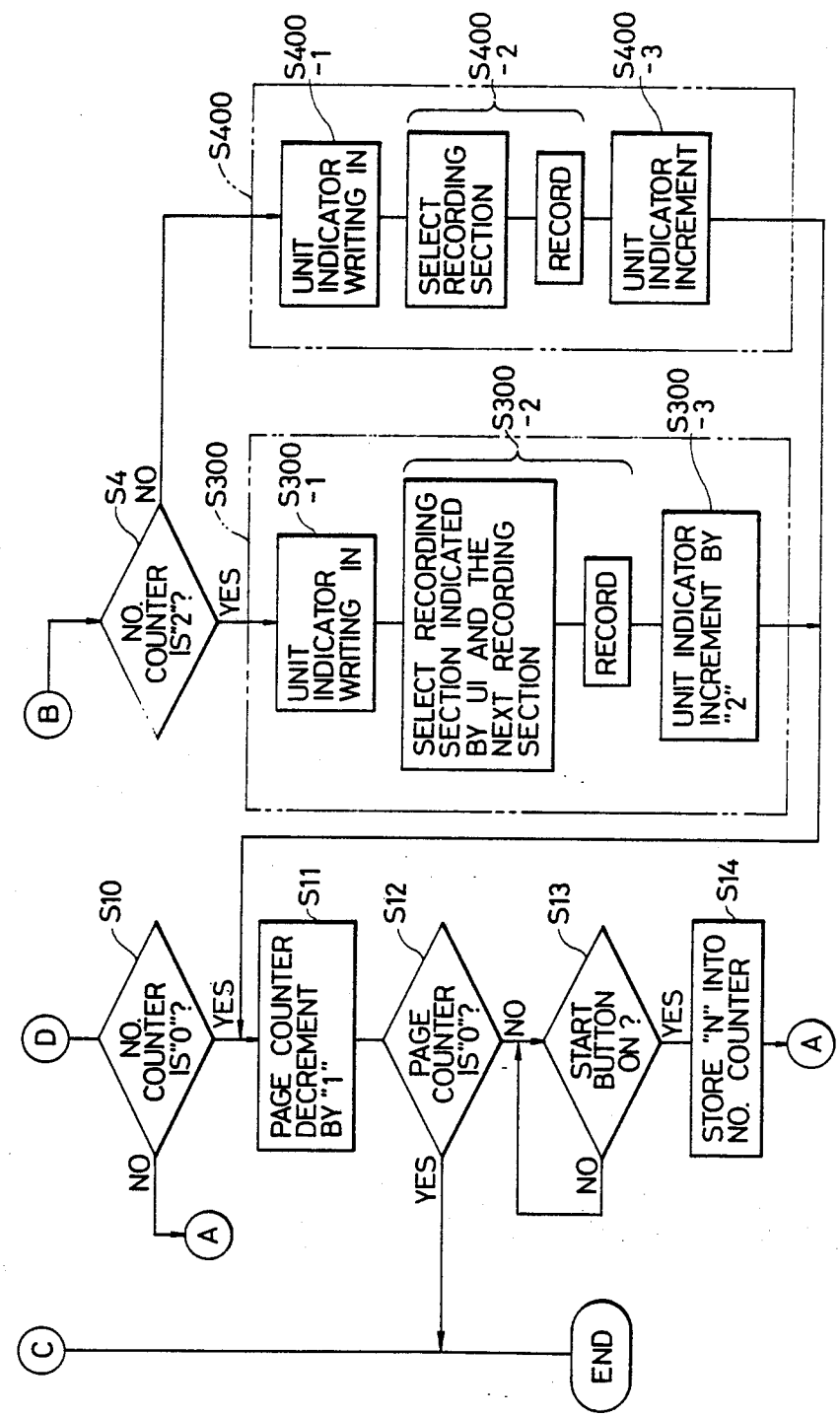

FIG. 9 is a flowchart showing the sequence for this purpose. As shown in this flowchart, according to this embodiment, the recording sections to be used are selected from the recording sections 100, 200 and 300. L and N specified by the operator are loaded in step S1. If L is "1", the flow branches to YES from step S2. In step S100, one recording section is driven for recording irrespective of the value of M. For selection of the recording section, a unit indicator 26 (corresponding to the particular area of the RAM) of the control 18-1 is used. The unit indicator 26 comprises a ternary counter. Every time the unit indicator 26 is incremented by one, the recording sections are specified in the order of 100, 200, 300, 100, 200, and so on. In step S100, the count of the unit indicator 26 is read out and the selection of the recording section is discriminated (step S100-1). The selected recording section is driven to perform recording (step S100-2). After recording, the unit indicator 26 is incremented by one (step S100-5).

If L is more than 1, the flow branches to NO from step S2 to advance to step S3. If M is 3 or more in this case, the flow advances to step S200, and recording is performed at all of the recording sections 100, 200 and 300 (step S200-1). After recording, the unit indicator 26 is incremented by 3 (step S200-2).

If L is 2, the flow advances to step S300. In step S300-1, the data indicated by the unit indicator 26 is read out. The recording section selected by the readout data from the unit indicator 26 and the next recording section are selected and driven for recording (step S300-2). After recording, the unit indicator 25 is incremented by "2" (step S300-3).

If L is 1 in step S4, the flow advances to step S400. The data indicated by the unit indicator 26 is read out (step S400-1). Recording is performed at the selected recording section (step S400-2). After recording, the unit indicator 26 is incremented by one (step S400-3).

A printing apparatus or system of this embodiment will now be described in further detail with reference to a case for producing five copies of an original of two pages.

The page dial 21 on the operation panel 19 is set to "2", the dial 20 is set to "5", and the copy button 22 is depressed. In step S0 shown in the flowchart of FIG. 4, the depression of the copy button 22 is discriminated by the control 18-1. The flow then advances to step S1 wherein L=2 and N=5 are loaded and stored in the page counter 25 and the counter 24, respectively. In step S2, it is discriminated if the count of the page counter 25 is "1". Since the count of the page counter 25 is "2" in this case, the flow advances to step S3 wherein it is discriminated if M stored in the counter 24 is 3 or more. In this case, the flow branches to YES (N=5>3) to advance to step S200. In step S200, the copy indicator 26 is read out under the control of the control 18-1 in step S200-1. The recording section indicated by the unit indicator 26 (to be referred to as the indicated recording section hereinafter) and the remaining recording sections, that is, all recording sections are selected for simultaneous recording of three copies (step S200-2). Then, the copy indicator 26 is incremented by "3" (step S200-3). "3" is subtracted from the count of the counter 24 to "2" (step S200-4).

If the copy indicator indicates the recording section 100 at the first time, when the indicator 26 is incremented by "3" in step S200-3, the indicated recording section changes in the order of 100, 200, 300, and 100. In step S100, it is discriminated if the count of the counter 24 is "0". Since the count of the counter 24 is "2" in this case, the flow branches to NO to return to step S3. In step S3, the flow branches to NO to advance to step S4. In step S4, it is discriminated if the count of the counter 24 is "2". The flow branches to YES from step S4 to advance to step S300. In step S300, the data of the unit indicator 26 is first read out in step S300-1 to select the indicated recording section (the recording section 100 in this case) as well as the next recording section (the recording section 200 in this case). These two recording sections are simultaneously driven for recording in step S300-2. The unit indicator 26 is then incremented by "2" to select the recording section 300 in step S300-3.

Thus, the copying operation of the original of one page for N=5 is terminated, and the flow advances to step S11. In step S11, "1" is subtracted from the count of the page counter 25 to make it "1". In step S12, it is discriminated if the count of the page counter 25 is "0". Since the flow branches to NO in this case, it advances to step S13 to wait for a start signal for the next page. The second page of the original is then placed on the original glass table 401 to depress the copy button 22. N=5 set by the dial 20 is stored in the counter 24 in the control 18-1 in step S14. The flow returns to step S3. Then, the second page of the original is recorded in the same manner as the first page. In step S200, copying is performed at all of the recording sections 100, 200 and 300. The data of the unit indicator 26 is incremented by "3" to select the recording section 300. In step S300, the recording sections 300 and 100 are driven for recording. The unit indicator 26 is incremented by "2" to change the indicated recording section from the recording section 300 to the recording section 200.

After producing five copies of the second page of the original, "1" is subtracted from the count of the page counter 25 in step S11. In step S12, it is discriminated if the count of the page counter 25 is "0". Since YES is obtained in this case, it is thus discriminated that copying for L=2 and N=5 has been completed.

A case for producing one copy each of the original of two pages will now be described. In this case, in step S1, L=2 and N=1 are stored in the counter 24 and the page counter 25, respectively. The flow advances through steps S2, S3 and S4 along the paths of NO. In step S400, recording is performed. In this case, recording is performed at the recording section 200 which is indicated by the unit indicator 26 (step S400-2). After recording, the unit indicator 26 is incremented by "1", and the indicated recording section is changed from the recording section 200 to the recording section 300. As for recording of the second page, it is performed at the recording section 300 in step S400. The unit indicator 26 is incremented by "1" to change the indicated recording section to the recording section 100.

In order to subsequently copy an original of one page, a discrimination of YES is made in step S2 and the flow advances to step S100. In step S100, the data of the unit indicator 26 is read out in step S100-1. The recording section 100 is selected and recording is performed in step S200-2. In step S100-3, "1" is subtracted from the count of the counter 24. It is then discriminated in step S100-4 if the count of the counter 24 is "0". If the discrimination result is NO, the flow returns to step S100-1 again for performing recording at the recording section 100. This loop is repeated until the count of the counter 24 becomes "0". When the count of the counter 24 becomes "0", YES is obtained in step S100-4 to advance to step S100-5. In step S100-5, the unit indicator 26 is incremented by "1" to select the recording section 200 as the indicated recording section. The copying operation is thus completed.

Figure 10:
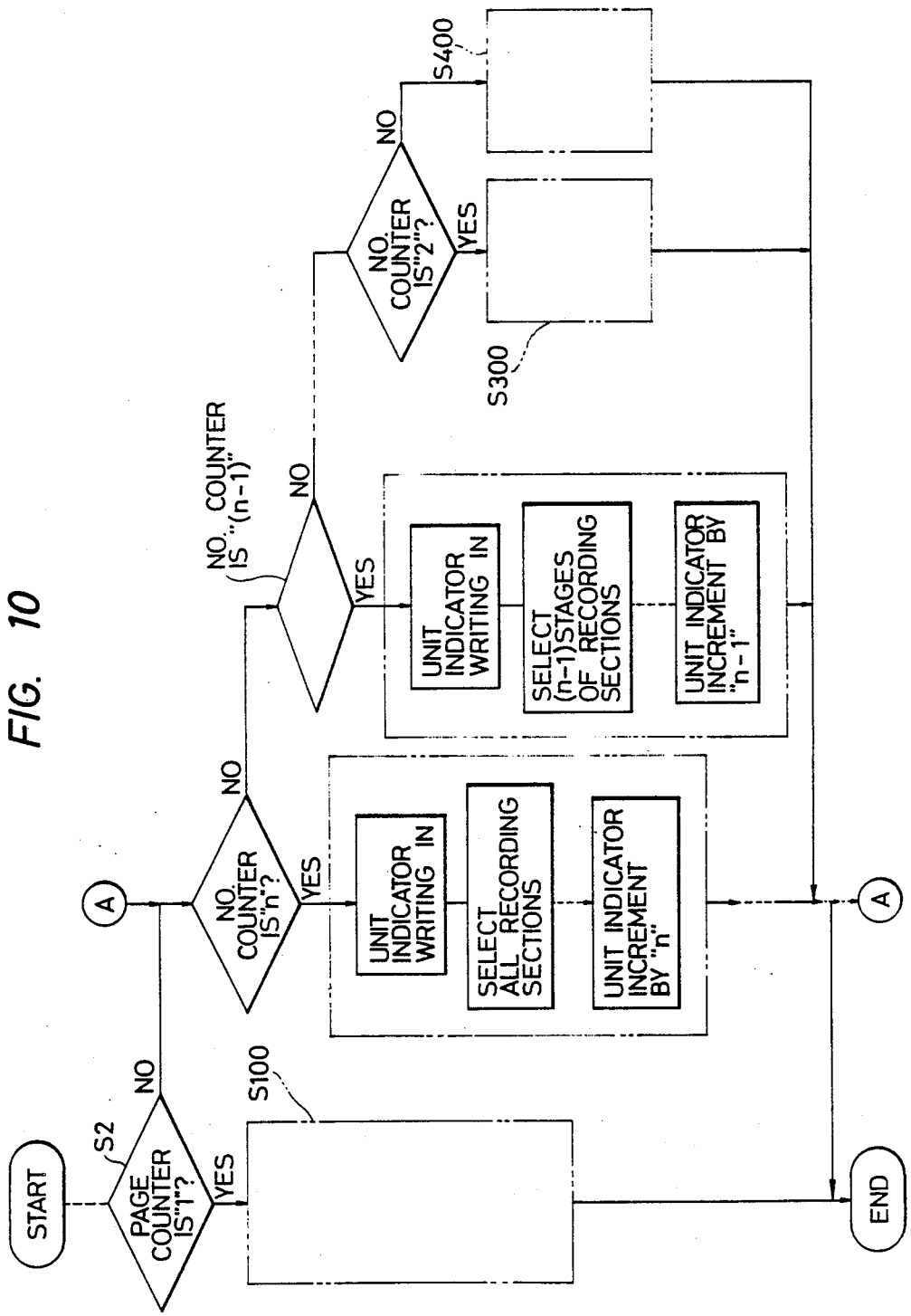

In the description made above, three recording sections are used. However, the present invention is not limited to this. For example, the present invention may be similarly applied to a printing apparatus or system which has n stages (where n=1, 2, 3 and so on) of recording sections as shown in FIG. 10.

In the embodiment described above, a plurality of recording sections are sequentially used. Therefore, a particular recording section may not be used more frequently than the others, preventing wear at only some recording sections. Moreover, a particular recording section may not be left unused for a prolonged period of time, preventing clogging of ink. The present invention is similarly applicable to a printing apparatus or system wherein at least one recording section has a plurality of recording heads.

Another embodiment of the present invention for performing recording in different modes according to the original color will now be described.

Figure 11:
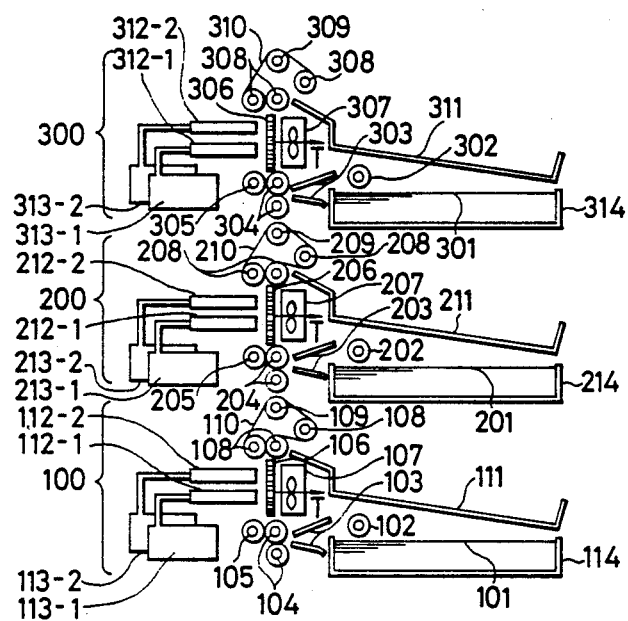
FIG. 11 is a schematic sectional view showing a recording apparatus or system according to another embodiment of the present invention.

FIG. 11 shows a printing apparatus according to this embodiment, which has, in addition to the parts shown in FIG. 1, two recording heads for each of the recording sections 100 to 300 such as inkjet heads 112-1, 112-2, 212-1, 212-2, 312-1 and 312-2. Each of these inkjet heads is a full-line type inkjet head wherein a plurality of recording elements are linearly arranged in the direction normal to the plane of the drawing. These recording heads perform recording in accordance with electric signals from a data source (not shown). In this embodiment, the inkjet heads 112-1, 212-1 and 312-1 perform the black normal mode recording at 16 dot/mm density, while the inkjet heads 112-1, 212-2 and 312-2 perform the red normal mode recording at 8 dot/mm density. The rest of the arrangement remains the same as that shown in FIG. 1.

Figure 12:
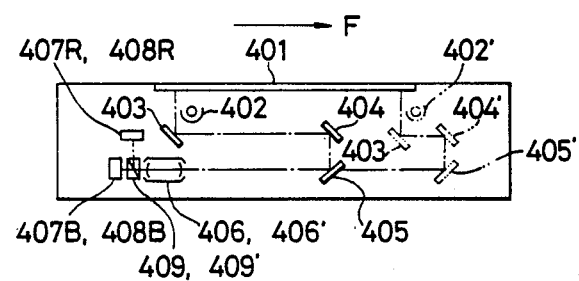
FIG. 12 is a schematic view showing an example of a readout device of the apparatus shown in FIG. 11.

FIG. 12 shows a readout device for the apparatus shown in FIG. 11. The readout device shown in FIG. 12 further has lenses 406 and 406' arranged in the direction normal to the surface of the sheet and color separation beam splitters 409 and 409' corresponding thereto, in addition to the parts shown in FIG. 2. These color separation beam splitters 409 and 409' have the spectral characteristics to reflect light of long wavelength and to transmit light of short wavelength. One-dimensional solid stage image pickup elements (e.g., CCDs) 407R and 407B, and 408R and 408B are arranged in correspondence with the beam splitters 409 and 409', respectively.

The lens 406, the beam splitter 409, and the CCDs 407R and 407B constitute one optical system, while the lens 496', the beam splitter 409', and the CCDs 408R and 408B constitute the other optical system. These two optical systems are optically equivalent to each other; each reads half of one main scanning line (normal to the plane of drawing). Therefore, if the image signals output from the CCDs are sequentially read out, raster scanning signals of the entire main scanning line are obtained.

The mode of operation of the readout device shown in FIG. 12 is similar to that described with reference to FIG. 2, except that the images are formed on the CCDs 407B, 408B, 407R and 408R by the lenses 406 and 406'.

Figure 13A:
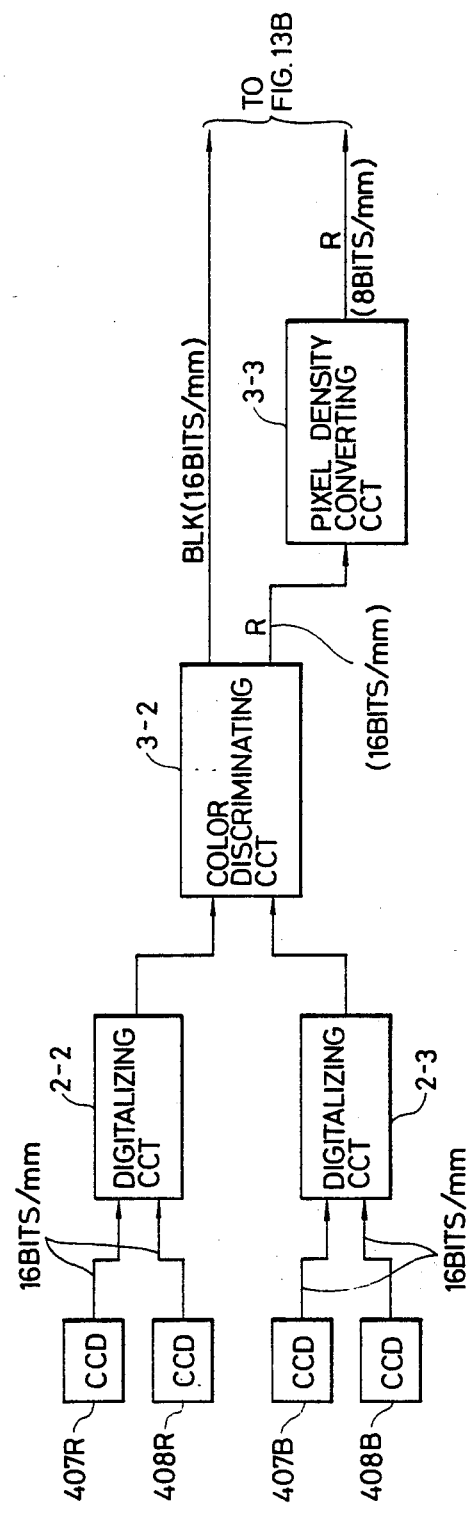
FIG. 13 composed of FIG. 13A
FIG. 13B is a block diagram of a control for the apparatus shown in FIG. 11.

FIG. 13 shows a block diagram of an example of a control for the apparatus shown in FIGS. 11 and 12. The control has digitizers 2-2 and 2-3; a color discriminating circuit 3-2 shown in detail FIG. 16; a picture element density converting circuit 3-3 shown in detail in FIG. 15; a memory 4-2 capable of reading and writing data; a memory control 5-2; buffer circuits 6-2, 7-2 and 8-2; driving circuits 9-2 to 11-3; and the inkjet heads 112-1 to 312-2 as shown in FIG. 11. A main control 18-2 controls the overall electric circuitry and mechanical parts. The main control 18-2 comprises a microcomputer as in the case of the control 18 as shown in FIG. 3. An operation panel 19-2 has a dial for setting the number of copies to be produced, a recording section selection button, a start button, and so on.

The mode of operation of the control shown in FIG. 13 will now be described. The CCDs 407B, 408B, 407R and 408R are all of the 1,728 bit configuration. The image data read by these CCDs is of 16 bit/mm density. The image data of 16 bit/mm density read out and output by the CCDs is digitized by the digitizer circuits 2-2 and 2-3. The digitized data is supplied to the color discriminating circuit 302 for discrimination of black or red.

The color discrimination is performed in the following manner. Since the CCDs 407B and 408B sense light of short wavelength, they are sensitive to white background of the original (where there is no image) and are not sensitive to black and red portions of the original. On the other hand, the CCDs 407R and 408R sense light of long waveform and are therefore sensitive to white background and red original and are not sensitive to black original. Therefore, if outputs are obtained from all of the CCDs, the original is white background. If no output is obtained from the CCDs, the original is a black original. If outputs are not obtained from the CCDs 407B and 408B and outputs are obtained from the CCDs 407R and 408R, the original is a red original. The discrimination algorithm is shown in Table 1 below.

TABLE 1

|  | Black original | Red original | White original |
| --- | --- | --- | --- |
| CCD 407B (Short CCD 408B wavelength) | No output | No output | Output produced |
| CCD 407R (Long CCD 408R wavelength) | No output | Output produced | Output produced |

Figure 16:
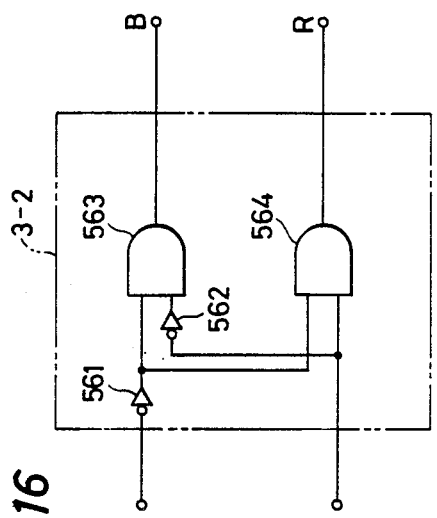
FIG. 16 is a circuit diagram of a color discriminating circuit.

For this purpose, the color discriminating circuit 3-2 may have the configuration as shown in FIG. 16, which has inverters 561 and 562 and AND gates 563 and 564. When the CCDs 407B, 408B, 407R and 408R sense light, the digitizers 2-2 and 2-3 produce signals of high level or level "H". Therefore, only when both digitizer circuits 2-2 and 2-3 produce the signals of low level or level "L", the AND gate 563 produces a signal of level "H", thus providing a black signal B. Only when the signal output from the digitizer circuit 2-2 is of level "L" and that from the digitizer circuit 2-3 is of level "H", the AND gate 564 produces a signal of level "H", thereby providing a red signal R.

Of these black and red signals B and R, the black signal B is stored in the memory 4-2 comprising a RAM (random-access memory) in the fine mode of 16 bit/mm density. On the other hand, the red signal is supplied to the picture element density converting circuit 3-3 to be converted into the normal mode data of 8 bit/mm density and is stored in the memory 4-2.

Figure 15:
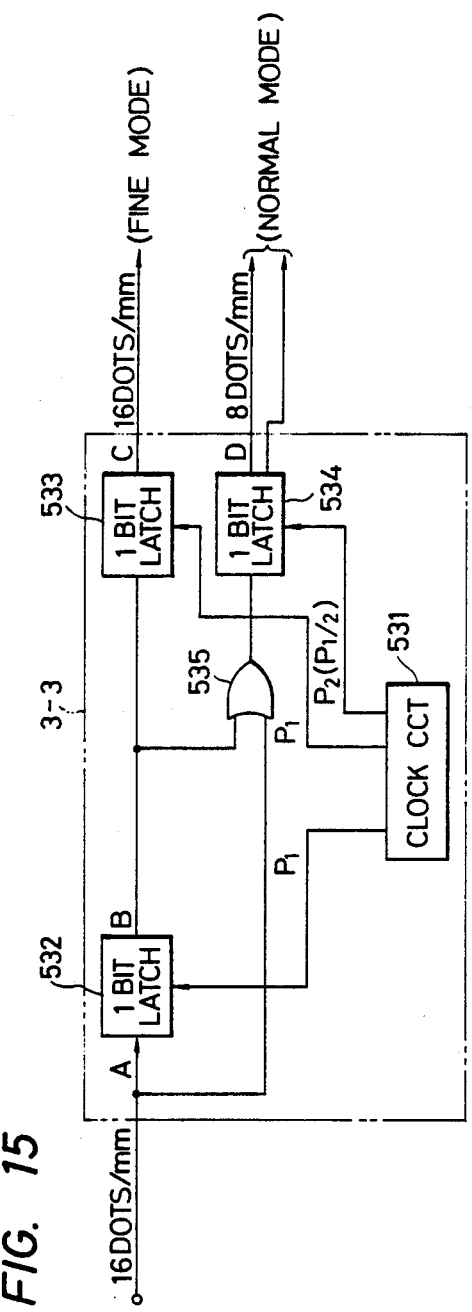
FIG. 15 is a block diagram of a picture element density converting circuit.

FIG. 15 shows an example of the picture element density converting circuit for main scanning. A clock circuit 531 produces pulses P1 corresponding to the number of bits of one line of the CCD and pulses P2 numbering half that of the pulses P1. One-bit latches 532 and 533 receive the pulses P1, while one-bit latch 534 receives the pulses P2. These one-bit latches latch 1-bit data in response to these pulses P1 and P2. An OR gate 535 receives the data of the first bit from the digitizer circuit as delayed by one bit through the 1-bit latch 532 and also receives the data of the second bit from the digitizer circuit. The OR gate 535 produces an OR product of the input data, which is supplied to the 1-bit latch 534. In the normal mode according to this embodiment, when both of two adjacent bits of the data are "1" or when either is "1", the image signal "1" is produced. On the other hand, if both bits are "0", the image data "0" is produced. The input data of 16 bit/mm density is converted into the image data of 8 bit/mm density to establish the normal mode. The output data from the 1-bit latch 533 is the image data of the fine mode and of 16 bit/mm density, which is delayed by two clocks. In this embodiment, the logic OR of the data of two adjacent bits is obtained for conversion of the input data into the normal data. However, the present invention is not limited to this. For example, an AND product may alternatively be used or sampling at every other bit may be performed. The fine mode based on the picture element density conversion in the subscanning direction may also be easily performed by varying the subscanning speed of the CCDs and the recording speeds of the recording sections corresponding thereto.

The memory and the memory control for the apparatus shown in FIG. 13 are similar configurations as those shown in FIG. 3.

The black and red signals B and R read out from the memory 4-2 are output to the buffer circuits 6-2 to 8-2 under the control of the memory control 5-2. The black and red signals R and B supplied to these buffer circuits are then supplied to the corresponding ones of the black inkjet heads 112-1, 212-1 and 312-1 and red inkjet heads 112-2, 212-2 and 312-2. The driving circuits 9-2 to 11-3 are controlled by the control 18-2 for the purpose of selection of the recording sections, as has been described with reference to FIG. 3. When the recording section selection button on the operation panel 19-2 is depressed, the corresponding driving circuit of the selected recording section is driven under the control of the control 18-2. Recording is thus performed. The black inkjet heads perform fine mode recording of 16 dot/mm density in accordance with the black signals B of 16 bit/mm density. The red inkjet heads perform normal mode recording of 8 dot/mm density in accordance with the red signals R of 8 bit/mm density. Thus, a black image which requires high resolution is printed at high density while a red image which does not require high resolution as much as the black image is recorded at low density.

Figure 14:
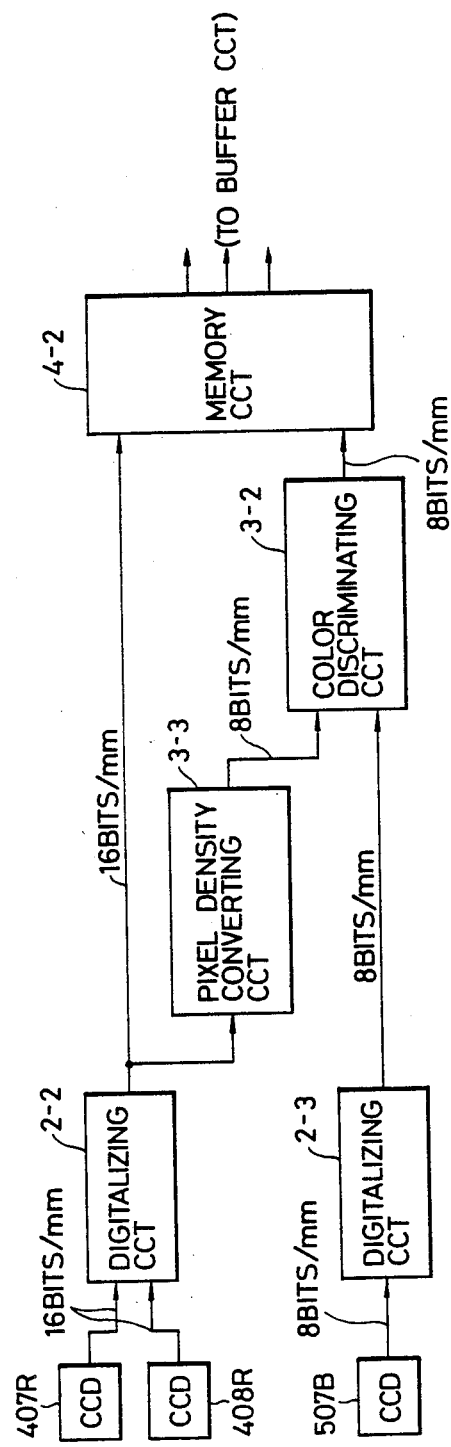
FIG. 14 is a block diagram of another example of a control for the apparatus shown in FIG. 4.

FIG. 14 shows still another embodiment of the present invention. This embodiment adopts a CCD 507B for reading the normal mode image data of 8 bit/mm density in place of the CCDs 407B and 408B. For recording in black at the recording sections 100, 200 and 300, the image data of 16 bit/mm density read out by the CCDs 407R and 407B is used. For recording in red, the image data of 16 bit/mm density and that of 8 bit/mm density respectively read out by the CCDs 407R and 408R and the CCD 507B for sensing the light of short wavelength are used. The image data read out by the CCDs 407R and 408R is supplied to the digitizer circuit 2-2 to be digitized and is then supplied to the memory 4-2 and the picture element density converting circuit 3-3. The picture element density converting circuit 3-3 produces the normal image data of 8 bit/mm which is then supplied to the color discriminating circuit 3-2. Meanwhile, the image data of normal mode and of 8 bit/mm density read out by the CCD 507B is supplied to the color discriminating circuit 3-2 through the digitizer circuit 2-3. The color discriminating circuit 3-2 supplies the image data of 8 bit/mm density which has been subjected to color discrimination.

As shown in Table 1, the CCDs 407R and 408R are not sensitive to a black original. If the black original is to be copied, the image data of 16 bit/mm density is supplied to and stored in the memory 4-2. The CCDs 407R and 408R are sensitive to a red original or white background. If the original is a red original, the image data of 16 bit/mm density read out by the CCDs 407R and 408R is supplied to the memory 4-2 but is not stored therein. This image data of 16 bit/mm density is also supplied to the picture element density converting circuit 3-3 which supplies the converted image data to the color discriminating circuit 3-2. The image data of 8 bit/mm density is also supplied to the color discriminating circuit 3-2 from the CCD 507B. On the basis of these pieces of image data, the color discriminating circuit 3-2 performs color discrimination of red and supplies the red image data of 8 bit/mm density to the memory 4-2 to be stored therein. Thus, the memory 4-2 stores the fine mode black data of 16 bit/mm density as well as the normal mode red data of 8 bit/mm density. In the same manner as with the embodiment shown in FIG. 3, fine mode black recording of 16 bit/mm density or normal mode red recording of 8 bit/mm recording may be freely performed.

In this embodiment, recording in black which requires high resolution is performed in the fine mode, while recording in red which does not require that much high resolution is performed in the normal mode. Therefore, the black portion of the original maintains its sharpness while the control system for recording in red may be simplified in configuration. Thus, power consumption is reduced to the minimum, and the cost of the apparatus may also be reduced to the minimum.

In the embodiments described above, the description has been made with reference to the case of recording in black and red. However, the present invention is not limited to this. Moreover, the recording density is not limited to 16 dots/mm and 8 dots/mm.

It is also possible to perform halftone mode recording by the dither processing or binary mode recording by without adoption of the dither processing.

By performing the copy number control as has been described with reference to FIGS. 4 to 10, it is possible to produce a desired number of copies in the sequential order at a specific or all recording sections.

Upon reception of an input signal from the operation panel, the control 18-2 can output a control signal so as to allow selection of conversion operation by the picture element converting circuit.

In the embodiment described above, the recording means are inkjet heads. Although the inkjet heads are advantageous for compact arrangement, the present invention is not limited to this. For example, thermal recording or electrostatic recording heads may be used instead. In the embodiments described above, the image data is the data of the original read out by the solid state image pickup elements. However, the image data may be characters, figures and so on which are generated by character generators or the like.

What we claim is:
1. A printing apparatus or system, comprising:
generating means for generating image data representing an image;
memory means connected to said generating means for storing image data generated by said means; and
a plurality of recording sections or heads connected to said generating means and said memory means for recording the image a number of times on a number of recording media on the basis of the image data from said generating means, wherein when the number of times the image is to be recorded is in excess of the number of said recording sections or heads, the excess number of image recordings are performed by said recording sections or heads on the basis of image data read out from said memory means.

2. A printing apparatus or system according to claim 1, wherein said generating means includes reading means for reading an original and for generating image data representing the original image.

3. A printing apparatus or system according to claim 1, wherein said recording sections or heads simultaneously perform image recordings based on the same image data.

4. A printing apparatus or system according to claim 1, wherein said memory means stores at least one page of image data.

5. A printing apparatus or system according to claim 1, further comprising means connected to said memory means and said recording sections or heads for setting a desired number of image recordings to be performed by said recording sections or heads.

6. A printing apparatus or system, comprising:
memory means for storing image data representing an image; readout means connected to said memory means for repeatedly reading out the same image data stored in said memory means;
image forming means connected to said memory means and being repeatedly operable for forming images on a recording medium in accordance with the image data repeatedly read out be said readout means;

a plurality of receptacles connected to said image forming means for receiving media on which images have been formed by said image forming means;

inputting means connected to said readout means and said image forming means for inputting numerical data determining the number of image formation operations to be performed by said image forming means; and control means connected to said image forming means for causing the image-bearing recording media produced by said number of image formation operations performed by said image forming means to be fed to a selected one of said receptacles.

7. A printing apparatus or system according to claim 6, wherein said readout means reads out the image data repeatedly in accordance with the number input by said inputting means.

8. A printing apparatus or system according to claim 6, wherein said control means includes selecting means for selecting one of said plurality of receptacles.

9. A printing apparatus or system according to claim 8, wherein said selecting means comprises a manually operable instruction input means.

10. A printing apparatus or system according to claim 8, wherein said selecting means is automatically operable to select the receptacle in accordance with the size of the image to be formed on the recording medium.

11. A printing apparatus or system according to claim 6, wherein said memory means is capable of storing image data of a plurality of pages.

12. A printing apparatus or system according to claim 6, further comprising reading means connected to said memory means for reading an image of an original and generating image data, wherein said memory means is arranged to store the image data from said reading means.

13. A printing apparatus or system, comprising;
reading means for reading an image of an original in a reading position relative to said reading means and generating image data representing the original;
a memory connected to said reading means for storing image data representing a plurality of originals read by said reading means;
exchanging means connected to said reading means for automatically exchanging one original in the reading position relative to said reading means with another original;
means connected to said memory and said exchanging means for storing image data corresponding to a particular original in said memory and then allowing said exchanging means to exchange the particular original for another original; and
printing means connected to said memory for printing an image in accordance with the image data stored in said memory.

14. A printing apparatus or system according to claim 13, wherein image data corresponding to a plurality of originals is provided sequentially from said memory to said printing means.

15. A printing apparatus or system according to claim 13, wherein said printing means further prints an image in accordance with image data supplied, regardless of said memory, from said reading means.

16. A printing apparatus or system, comprising:
generating means for generating image data, the image data representing a plurality of original images different from each other;
memory means connected to said generating means for storing image data generated by said generating means representing a plurality of original images; and
recording means connected to said generating means and said memory means for recording images on a recording medium on the basis of image data supplied to said recording means, wherein the image data representing the original images generated by said generating means are supplied to said recording means and are stored in said memory means while said recording means records original images one at a time, and thereafter said memory means sequentially supplies to said recording means the image data stored in said memory means corresponding to a plurality of originals and said recording means records the original images.

17. A printing apparatus or system according to claim 16, wherein said generating means reads an original and generates image data representing the original image.

18. A printing apparatus or system according to claim 16, wherein upon repeated recordings of the same image, a first recording is performed on the basis of the image data from said generating means, and second and following recordings are performed on the basis of the image data read out from said memory means.

19. A printing apparatus or system according to claim 16, further comprising means connected to said recording means for setting a desired number of image recordings to be performed by said recording means.

20. A printing apparatus or system, comprising;
a memory for storing image data representing an image;
image forming means connected to said memory for forming an image on a recording medium on the basis of the image data stored in said memory;
monitoring means connected to said memory for monitoring the size of an image represented by the image data stored in said memory; and
control means connected to said image forming means and said monitoring means for controlling said image forming means in accordance with the size monitoring be said monitoring means.

21. A printing apparatus of system according to claim 20, wherein said monitoring means monitors a size by counting an address of said memory.

22. A printing apparatus or system according to claim 20, wherein said image forming means includes a plurality of recording sections for recording images the sizes of which are different from each other, wherein said control means selects one of said recording sections in accordance with the size monitored by said monitoring means.

23. A printing apparatus or system according to claim 20, further comprising reading means connected to said memory for reading an image of an original and for generating image data representing the original to be used by said image forming means as the basis for forming an image.

24. A printing apparatus or system, comprising:
generating means for generating image data representing an image;
a plurality of recording sections or heads connected to said generating means adapted to record an image on a recording medium on the basis of the image data generated by said generating means; and selecting means connected to said recording sections or heads for selecting at least one of said recording sections or heads to record the image, wherein said selecting means performs the selection depending on which of said recording sections or heads is being used.

25. A printing apparatus or system according to claim 24, wherein said selecting means selects a recording section or head to be used for succeeding image recording in accordance with the recording section or head used for the preceding image recording.

26. A printing apparatus of system according to claim 24, further comprising setting means connected to said recording sections or heads and said selecting means for setting a desired number of image recordings to be performed by said recording section or heads, wherein said selecting means performs a selection in accordance with the number set by said setting means.

27. A printing apparatus or system according to claim 26, wherein when the number of said image recordings set by said setting means is equal to or more than the number of said recording sections or heads, said selecting means selects all of said recording sections or heads.

28. A printing apparatus or system according to claim 24, wherein said generating means includes reading means for reading an original and for generating image data representing the original image.

* * * * *

UNITED STATES PATENT AND TRADEMARK OFFICE
CERTIFICATE OF CORRECTION

PATENT NO. : 4,866,532
DATED : September 12, 1989
INVENTOR(S) : NAOKI AYATA ET AL.

Page 1 of 4

It is certified that error appears in the above-identified patent and that said Letters Patent is hereby corrected as shown below:

Title page,
    Item [54] "FOR" should read --OR--.
Col. 1, line 52, "underlying" should read --underlining--.

COLUMN 3

Line 29, "register roller 104, 204 and 304;" should read --register rollers 104, 204 and 304;--.
Line 51, "past" should read --having passed--.
Line 67, "light source" should read --light source 402--.

COLUMN 4

Line 37, "or" should read --on--.
Line 57, "second, third" should read --second, and third--.

COLUMN 6

Line 6, "store" should read --stores--.
Line 9, "stages X" should read --stages x--.
Line 17, "stages X" should read --stages x--.
Line 19, "N=3X(M-1)+M     (1)" should read --N=3X(M-1)+x     (1)--.
Line 24, "X." should read --x.-- and "X" should read --x--.
Line 28, "X" should read --x-- (both occurrences).

UNITED STATES PATENT AND TRADEMARK OFFICE
CERTIFICATE OF CORRECTION

PATENT NO. : 4,866,532
DATED : September 12, 1989
INVENTOR(S) : NAOKI AYATA ET AL.

It is certified that error appears in the above-identified patent and that said Letters Patent is hereby corrected as shown below:

COLUMN 7

Line 17, "therefore" should read --therefor--.
    Line 36, "forth" should read --fourth--.
    Line 52, "X" should read --x--.

COLUMN 8

Line 29, "store" should read --stores--.
    Line 60, "or" should read --of--.

COLUMN 9

Line 55, "input" should read --be input--.

COLUMN 10

Line 53, "25" should read --26--.
    Line 66, "FIG. 4," should read --FIG. 9,--.

COLUMN 12

Line 14, "step S200-2." should read
        --step S100-2.--.
    Line 57, "112-1," should read --112-2--.

COLUMN 13

Line 2, "solid stage" should read --solid state--.
    Line 9, "lens 496'," should read --lens 406',--.
    Line 22, "FIG. 16;" should read --in FIG. 16;--.

UNITED STATES PATENT AND TRADEMARK OFFICE
CERTIFICATE OF CORRECTION

PATENT NO. : 4,866,532

DATED : September 12, 1989

INVENTOR(S) : NAOKI AYATA ET AL.

It is certified that error appears in the above-identified patent and that said Letters Patent is hereby corrected as shown below:

COLUMN 15

Line 55, "8 bit/mm recording" should read --8 bit/mm density--.

COLUMN 16

Line 4, "by" (second occurrence) should be deleted.
    Line 14, "embodiment" should read --embodiments--.
    Line 29, "said means;" should read --said generating means;--.
    Line 67, "be" should read --by--.

COLUMN 18

Line 46, "monitoring be" should read --monitored by--.
    Line 47, "of" should read --or--.

UNITED STATES PATENT AND TRADEMARK OFFICE
CERTIFICATE OF CORRECTION

PATENT NO. : 4,866,532

DATED : September 12, 1989

INVENTOR(S) : NAOKI AYATA ET AL.

It is certified that error appears in the above-identified patent and that said Letters Patent is hereby corrected as shown below:

COLUMN 19

Line 14, "of" should read --or--.

Signed and Sealed this

Twenty-third Day of April, 1991

Attest:

HARRY F. MANBECK, JR.

Attesting Officer

Commissioner of Patents and Trademarks